(12) United States Patent
Fjordbotten

(10) Patent No.: US 6,259,358 B1
(45) Date of Patent: Jul. 10, 2001

(54) SCHOOL BUS SAFETY DEVICE

(76) Inventor: Paul Fjordbotten, 42 Mountain Street West, Calgary, Alberta (CA), T0L 1T2

(*) Notice: Subject to any disclaimer, the term of this patent is extended or adjusted under 35 U.S.C. 154(b) by 0 days.

(21) Appl. No.: 09/441,277

(22) Filed: Nov. 16, 1999

(51) Int. Cl.$^7$ .................................................. B60Q 1/26
(52) U.S. Cl. ..................... 340/433; 340/425.5; 340/438; 307/10.6; 307/9.1
(58) Field of Search ................................. 340/433, 425.5, 340/438, 439, 441, 457, 528; 307/10.6, 10.2, 10.3, 9.1

(56) References Cited

U.S. PATENT DOCUMENTS

| | | | |
|---|---|---|---|
| 3,742,434 | 6/1973 | Leyde | 49/25 |
| 3,842,397 | 10/1974 | Sindle | 367/111 |
| 3,997,866 | 12/1976 | Taylor | 367/102 |
| 4,016,528 | 4/1977 | Takeuchi | 367/94 |
| 4,016,529 | 4/1977 | Inuzka | 367/93 |
| 4,023,135 | 5/1977 | Hanmura | 367/93 |
| 4,112,419 | 9/1978 | Kinoshita | 340/560 |
| 4,260,980 | 4/1981 | Bates | 340/904 |
| 4,300,116 | 11/1981 | Stahovec | 340/904 |
| 4,864,298 | 9/1989 | Dombrowski | 340/904 |
| 5,128,651 * | 7/1992 | Heckart | 340/433 |
| 5,243,323 * | 9/1993 | Rogers | 340/433 |
| 5,250,945 | 10/1993 | Dombrowski | 340/901 |
| 5,563,576 * | 10/1996 | Drori et al. | 340/455 |
| 5,670,953 | 9/1997 | Satoh | 340/903 |
| 5,874,891 * | 2/1999 | Lowe | 340/433 |

* cited by examiner

Primary Examiner—Daniel J. Wu
Assistant Examiner—Toan Pham
(74) Attorney, Agent, or Firm—David S. Thompson

(57) ABSTRACT

A school bus safety device provides an engine status line wired to a voltage detection location. The voltage detection location is a point in the electrical system of the school bus which is typically at a high voltage potential when the engine is in operation, and is at the same potential as ground when the engine is turned off. An edge-triggered logic device, such as a flip-flop, receives the engine status line as a clock pulse input. In a typical application, the falling edge of the engine status line causes the output line of the logic device to go high, thereby driving an annunciator, such as a buzzer. Therefore, turning off the engine of the bus causes the buzzer to sound. The driver walks to the rear of the bus and notices if any sleeping children are left on board. A key switch device, located in the back of the bus, is used to send a reset to the logic device, thereby turning off the buzzer. The driver then walks back to the front of the bus, double-checking to see that all children are off the bus.

3 Claims, 1 Drawing Sheet

SCHOOL BUS SAFETY DEVICE

CROSS-REFERENCES

There are no applications related to this application filed in this or any foreign country.

BACKGROUND

It is known that there is a tendency for children to fall asleep on school busses, and that school bus drivers should make a thorough inspection of the entire length of the bus after concluding each route. Only by a visual examination, made by walking the entire length of the school bus, can it be determined that no children have fallen asleep in any of the seats. Only by strict adherence to a program requiring the driver to walk to the back of the bus after the conclusion of every route can such a visual examination be made.

The problem with such a program of visual examination is that the school bus driver will frequently fail to carry out the inspection. The failure may stem from forgetfulness, laziness or a strong but possibly erroneous feeling that no children are still on the bus.

For the foregoing reasons, there is a need for school bus safety device that can prevent sleeping children from being left on the school bus. Such a safety device must require the school bus driver to walk to the very end of the bus each time that the engine is turned off, thereby providing the driver with every opportunity to see any child left on the bus. The school bus safety device must operate automatically, in a manner that does not depend on the bus driver's memory, school policy or other factor. The school bus safety device must allow engine operation in an emergency, without requiring the driver to walk to the end of the bus.

SUMMARY

The present invention is directed to an apparatus that satisfies the above needs. A novel school bus safety device is disclosed that includes an edge-triggered logic device which detects the falling voltage associated with turning off the bus engine. Upon detection of such a signal, the logic device turns on a buzzer. A key switch, located at the back of the bus requires that the driver go to the rear of the bus, confirming that no children are on the bus. Activation of the key switch resets the logic device and turns off the buzzer.

The school bus safety device of the present invention provides some or all of the following structures.

(A) An engine status line is wired to a voltage detection location in the bus electrical system. The voltage detection location is selected so that high voltage, i.e. approximately 12 volts, is present when the ignition key is not in the off position, and low voltage, i.e. ground, is present when the ignition key is in the off position. The engine status line is therefore high when the engine is on and low when the engine is off.

(B) The clock pulse input of an edge-triggered logic device, such as a flip-flop, is attached to the engine status line. The falling edge (i.e. the change from high voltage to low voltage) of the engine status line triggers the logic device to turn on an output, i.e. to send the output to a high voltage state. Therefore, when the engine turns off, the output of the logic device turns on.

(C) A buzzer is attached to the output of the logic device. When the falling edge of the engine status line is detected, the output is turned on, thereby turning on the buzzer.

As a result, when the engine is turned off, the buzzer is turned on.

(D) A key switch requires an individual key for operation. The key switch is located in the rear of the bus, thereby requiring the bus driver to walk to the rear of the bus, thereby providing every opportunity to see any sleeping child who has failed to exit the bus. The key switch, when activated, applies a clear signal to the logic device resulting in the output turning off. As a result, when the key switch is operated, the buzzer turns off.

It is therefore a primary advantage of the present invention to provide a novel school bus safety device that electronically requires the bus driver to walk from the front of the bus to the back of the bus to turn off an alarm which turns on automatically when the bus engine is turned off. By walking from the front of the bus to the rear of the bus, and back again, the bus driver has every opportunity to see any child who has fallen asleep and failed to exit the bus.

Another advantage of the present invention is to provide a novel school bus safety device that reinforces policies and procedures which requires bus drivers to examine the bus before leaving the bus after completion of the route.

A still further advantage of the present invention is to provide a novel school bus safety device that is inexpensive to manufacture and install, difficult to override or defeat, and which prevents a driver from leaving the bus without checking for sleeping children.

DRAWINGS

These and other features, aspects, and advantages of the present invention will become better understood with regard to the following description, appended claims, and accompanying drawings where:

DESCRIPTION

Figure 1:
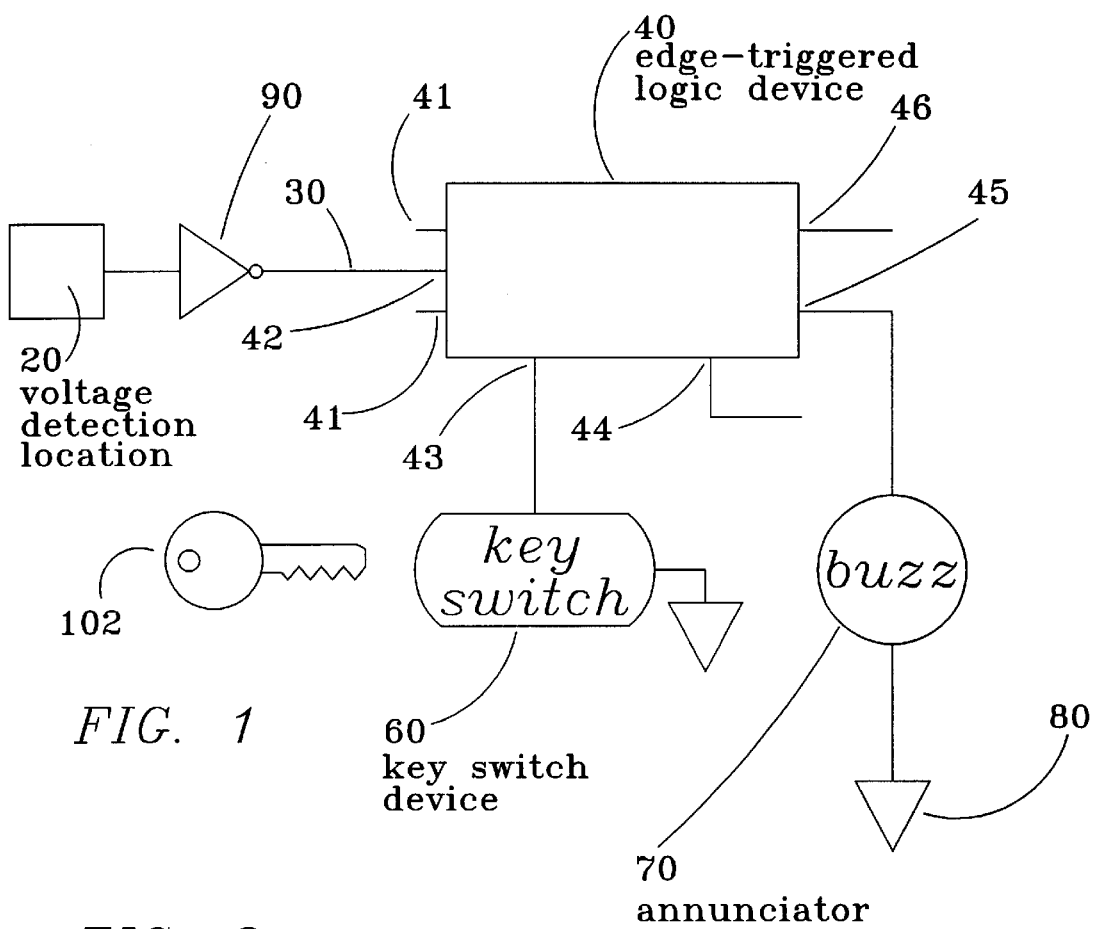
FIG. 1 is a diagrammatic circuit schematic showing in general terms the structure of a preferred version of the invention.
Figure 2:
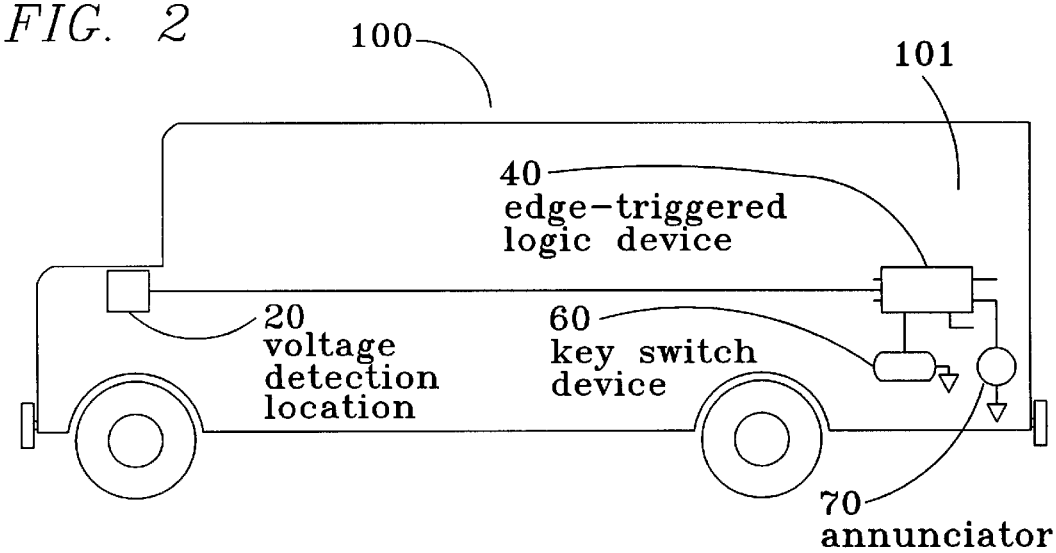
FIG. 2 is a diagrammatic view of the circuit of FIG. 1 as applied to the typical school bus.

Referring in generally to FIGS. 1 and 2, a school bus safety device 10 constructed in accordance with the principles of the invention is seen. An engine status line 30 is wired to a voltage detection location 20. The voltage detection location is a point in the electrical system of the school bus 100 which is typically at a high voltage potential when the engine is in operation, and is at the same potential as ground 80 when the engine is turned off. An edge-triggered logic device 40, such as a flip-flop, receives the engine status line as a clock pulse input. In a typical application, the falling edge of the engine status line causes the output line of the logic device to go high, thereby driving an annunciator, such as a buzzer 70. Therefore, turning off the engine of the bus causes the buzzer to sound. The driver walks to the rear of the bus and notices if any sleeping children are left on board. A key switch device 60, located in the back of the bus, is used to send a reset to the logic device, thereby turning off the buzzer. The driver then walks back to the front of the bus, doublechecking to see that all children are off the bus.

An engine status line 30 is wired to a voltage detection location 20 in the bus electrical system. The voltage detection location is selected so that high voltage, i.e. approximately 12 volts, is present when the ignition key is not in the off position, and low voltage, i.e. ground, is present when the ignition key is in the off position. The engine status line is therefore high when the engine is on and low when the engine is off. A falling edge, i.e. the voltage transition from high to low, indicates that the engine is in the process of turning off.

The voltage detection location 20 may be selected from any of a number of points in the electrical system of the bus which are at elevated electrical potential when the ignition switch of the engine is not in the off position. For example, when the ignition switch is not in the off position, 12 volts is applied to the automotive-type radio, so that if the radio is turned on, current will flow. When the ignition switch is moved to the off position, the voltage applied to the radio is at the same level as ground. The voltage detection location could therefore be selected to be such a location.

In a preferred embodiment, engine status line means transmits information on the status of the engine, i.e. whether the engine is operating, being turned off, or not operating. A preferred version of the engine status line means includes an engine status line 30, which is a wire connected to the voltage detection location 20. The voltage level of the engine status line reflects the status of the engine's operation, i.e. whether the engine is turned on or off. In particular, the engine status line provides a status change signal when the engine is turned off. The status change signal is a falling (or rising) edge on the voltage potential on the engine status line.

The status change signal is typically a falling edge, i.e. a voltage transition on the engine status line 30 as the voltage drops from a first level, such as 12 volts, which indicates operation of the engine, to a second level, such as ground, which indicates that the engine is not operational. It is easily seen that, by use of an inverter, the status change signal could be changed to become a rising edge.

A logic device 40, such as a flip-flop, is edge-triggered. As a result, the falling (or rising) edge of the engine status line is detected; i.e. the change from high to low voltage (or low to high voltage) is detected by the logic device.

The device may be either falling or rising edge-triggered, if the appropriate inverters are used prior to the input. For example, where the falling edge from the engine status line is to be detected, the clock pulse input 42 of the logic device should detect a falling edge; however, with an optional inverter 90 on the engine status line, the logic device selected could be of a type designed to detect a rising edge.

A preferred logic device 40 should provide an input 41, a clock pulse input 42, a direct clear input 43, a direct set input 44, an output 45 and an inverted output 46. It is typically the case that some of the inputs and outputs are not used.

The clock pulse input 42 of the edge-triggered logic device 40 is attached to the engine status line 30. The falling edge (i.e. the status change signal or the change from high voltage to low voltage) of the engine status line triggers the logic device to turn on an output 45, i.e. to send the output to a high voltage state. Therefore, when the engine turns off, the output of the logic device turns on.

An annunciator 70 is driven by the output 45 of the logic device 40. In a preferred embodiment of the invention, the annunciator is a buzzer, bell or similar device.

An input to the buzzer is attached to the output of the logic device, and an output is attached to ground.

When the falling edge of the engine status line is detected, the output is turned on, thereby turning on the buzzer. As a result, when the engine is turned off, the buzzer is turned on.

A preferred key switch means includes a key switch 60 and is located in the rear portion of the bus. Location of the key switch in the rear 101 of the bus forces the driver to walk to the end of the bus to activate the key switch, thereby providing every opportunity to see any sleeping child who has failed to exit the bus. As a result, the driver will see any sleeping children and also any belongings left by children.

The key switch 60 is connected to the direct clear, direct set or reset terminal of the logic device. While the terminology may vary, such a reset should result in the output moving to the desired state. As a result, activation of the key switch will put the logic device into a state wherein the output 45 does not drive the annunciator 70. The key switch should also be connected to ground or high voltage, depending on the needs of the direct clear or reset terminal. Appropriate pull-up or pull-down resistors should be used, so that when the key switch is activated, the appropriate signal, either low or high, is transmitted to the reset terminal.

The preferred key switch 70 requires the key 102 for operation. The key switch, when activated, applies a clear signal to the logic device resulting in the output turning off. As a result, when the key switch is operated, the buzzer turns off.

In operation, the bus driver turns on the bus in the normal manner, using the ignition key, and drives the complete route. When the engine is then turned off, the voltage potential at the voltage detection location 20 falls from the operational 12 volt level to the non-operational ground level. As a result, the engine status line 30 transmits a falling edge as the voltage goes from high (indicating operation of the engine) to low (indicating that the engine is off). The falling edge is transmitted to the clock pulse input 42 of the edge triggered logic device by the engine status line.

The logic device 40, detecting the falling edge raises the voltage potential of the output 45, thereby turning on the buzzer 70.

To turn off the buzzer, the bus driver walks to the back of the bus, observing that the bus is truly empty of children. The bus driver then inserts the key 102 into the key switch device 60, which sends a signal to the direct clear input 43, causing the logic device to reset, which causes the output 45 to go low, and the buzzer 70 to turn off.

The previously described versions of the present invention have many advantages, including a primary advantage of providing a novel school bus safety device that electronically requires the bus driver to walk from the front of the bus to the back of the bus to turn off an alarm which turns on automatically when the bus engine is turned off. By walking from the front of the bus to the rear of the bus, and back again, the bus driver has every opportunity to see any child who has fallen asleep and failed to exit the bus.

Another advantage of the present invention is to provide a novel school bus safety device that reinforces policies and procedures which requires bus drivers to examine the bus before leaving the bus after completion of the route.

A still further advantage of the present invention is to provide a novel school bus safety device that is inexpensive to manufacture and install, difficult to override or defeat, and which prevents a driver from leaving the bus without checking for sleeping children.

Although the present invention has been described in considerable detail and with reference to certain preferred versions, other versions are possible. For example, while the preferred version of the invention makes reference to certain circuit components which are active high or low, or which have a rising or falling edge. It is clear that in many cases, inverters or alternate circuit components could be used in a manner which could result in substitution of a rising edge for a falling edge or substitution of active high for active low. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A school bus safety device adapted for use with a school bus having a front portion and a rear portion, and having an electrical system having a voltage detection location wherein a first voltage Potential results when an ignition switch is not in an off position, and wherein a second voltage potential results when the ignition switch is in the off position, the school bus safety device comprising:
   (A) engine status line means, connected to the voltage detection location of the electrical system of the school bus, for transmitting a status change signal when the engine is turned off, wherein the status chance signal is a voltage transition from the first voltage potential to a second voltage potential;
   (B) logic device means, located in the rear portion of the school bus, having a clock pulse input, an output and a direct clear input, the clock pulse input attached to, and in electrical communication with, the engine status line means, for receiving the status change signal and for turning on the output to a high voltage state in response to the translation of the status change signal from the first voltage potential to the second voltage potential, the logic device means comprising an edge-triggered flip-flop digital switching device;
   (C) an annunciator, driven by the output of the logic device means when the output of the logic device means is in a high voltage state in response to the translation from a first voltage potential to a second voltage potential of the engine status line;
   (D) key switch means, located in the rear portion of the bus and connected to the direct clear input of the logic device means, for resetting the logic device to a state wherein the output does not drive the annunciator; and
   (E) a key, sized for operation of the key switch means, whereby use of the key allows operation of the key switch means, resetting the logic device means to a state wherein the output does not drive the annunciator.

2. The school bus safety device of claim 1, wherein an inverter is carried by the engine status line means, whereby the voltage detection location may be selected to be a location wherein the first voltage potential is less than the second voltage potential.

3. The school bus safety device of claim 1, wherein the annunciator is a buzzer.

* * * * *